United States Patent Office.

HARRISON V. APPLEY, OF GRAND RAPIDS, MICHIGAN.

ANTI-RATTLER FOR THILL-COUPLINGS.

SPECIFICATION forming part of Letters Patent No. 471,503, dated March 22, 1892.

Application filed November 25, 1891. Serial No. 413,133. (No model.)

*To all whom it may concern:*

Be it known that I, HARRISON V. APPLEY, a citizen of the United States, residing at Grand Rapids, in the county of Kent and State of Michigan, have invented a new and useful Improvement in Anti-Rattlers for Thill-Couplings, of which the following is a specification.

My invention relates to devices for preventing the clips that connect the thills of vehicles with the axle-tree thereof from rattling when the vehicle is in motion; and its objects are, first, to provide an anti-rattler that may be applied to any coupling-bolt; second, to provide a device that may be applied by simply screwing the nut upon the bolt and will not be unsightly, and, third, to provide an anti-rattling device that will at the same time form an efficient nut-lock.

Figure 1:
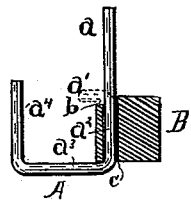
Figure 2:
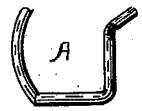
Figure 3:
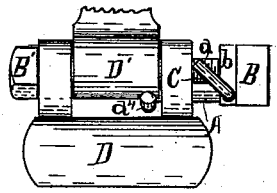
Figure 4:
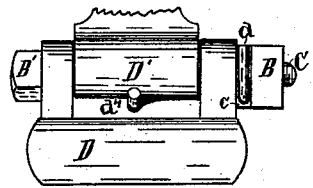
Figure 5:
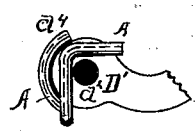
Figure 6:

Referring to the accompanying drawings, Figure 1 shows the blank from which the spring portion of my device is made and a section of the nut or bolt-head that supports it. Fig. 2 is a perspective of the spring. Fig. 3 is a plan of a clip with the end of the bolt just entering the nut and the spring in position to show the manner of pressing the end forcibly against the clip. Fig. 4 is the same with the nut drawn to place. Fig. 5 is a side view of the barrel of the clip with the spring in position. Fig. 6 shows the aperture in the nut or bolt-head for the reception of the spring; and Fig. 7 is a modified form for the spring.

Similar letters refer to similar parts throughout the several views.

To construct my device, I use, first, a heavy spring-wire A, which I bend twice at right angles, as shown in Fig. 1. I then prepare the nut B on the head of the bolt with a rabbet $b$, cut from one corner, and an aperture $c$, running therefrom through the bolt-head or nut at right angles with said rabbet and to one side of the body C of the bolt. I then pass one end of the U-shaped spring A through the aperture and bend the projecting end $a$ thereof down upon the rabbet $b$ at right angles with the portion that passes through the aperture in the nut, and so that it will stand at an acute angle with the projecting arm $a^3$ of the spring, as shown at $a'$ in Fig. 1, and bend the end $a^4$ to the form of the end of the clip-barrel D', as shown in Fig. 5, so that when the clip-barrel is in place in the clip and the bolt C is passed through both and entered into the nut the end $a$ of the spring will press against the side of the clip, while the end $a^4$ rests against the back of the clip-barrel between the two wings of the clip, so that as the bolt is forced into the nut or the nut is screwed onto the bolt and drawn to place the spring produced by carrying the end $a$ around into the rabbet $b$ parallel with the clip will force the end $a^4$ of the spring solidly against the end of the clip-barrel and render it impossible for the clip to rattle, no matter how much the bolt may be worn.

Figure 7:
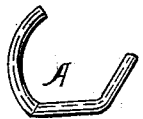

I prefer that the springs A be attached to the nut, as in Figs. 1, 3, and 4, as by this means it is only necessary to furnish the nut and spring, which can be attached to any bolt; and in case the bolts wear out they can be replaced without the necessity of purchasing a new spring and a bolt made expressly for use with my device, and for the further reason that when attached to the nut it forms a nut-lock and averts all danger of the nut ever unscrewing from the bolt; but I do not restrict myself to this exact form of spring, as by the turning of the nut one-quarter around, so that the aperture $c$ will be on the lower side of the nut and lie horizontal, the end $a$ of the spring may be turned at right angles with the arm $a^4$, as shown in Fig. 7, or it may be made in any other available form, the object to be attained being to bring the wing $a^4$ to bear forcibly against the end of the clip-barrel.

When the spring is attached to the nut, as in Figs. 3 and 4, it is secured to the clip by turning the bolt instead of the nut to screw them together.

Having thus fully described my invention, what I claim as new, and desire to secure by Letters Patent of the United States, is—

1. The combination, with a thill-coupling, of a bolt and nut, an aperture and a rabbet for the reception of a spring, and a spring adapted to pass through said aperture, with one end bent down to rest in said rabbet and press heavily against the side of the clip and the opposite end arranged to press against the back of the clip-barrel, substantially as and for the purpose set forth.

2. The combination, with a thill-coupling, (No Model.)

H. V. APPLEY.
ANTI-RATTLER FOR THILL COUPLINGS.

No. 471,503. Patented Mar. 22, 1892.

Witnesses:
George H. White.
E. M. Whinney.

Inventor:
Harrison V. Appley
By Ithiel J. Cilley
Attorney.